Feb. 2, 1954 J. J. OKRENT 2,668,237

SIGNAL MAGNITUDE CONTROL SYSTEM

Filed Sept. 13, 1951 2 Sheets-Sheet 1

INVENTOR.
JASPER J. OKRENT
BY Laurence B. Dodds
ATTORNEY

INVENTOR.
JASPER J. OKRENT
BY Lawrence B. Dodds
ATTORNEY

Patented Feb. 2, 1954

2,668,237

UNITED STATES PATENT OFFICE 2,668,237

SIGNAL MAGNITUDE CONTROL SYSTEM

Jasper J. Okrent, Flushing, N. Y., assignor to Hazeltine Research, Inc., Chicago, Ill., a corporation of Illinois Application September 13, 1951, Serial No. 246,458

9 Claims. (Cl. 250—27)

*General*

Figure 1:
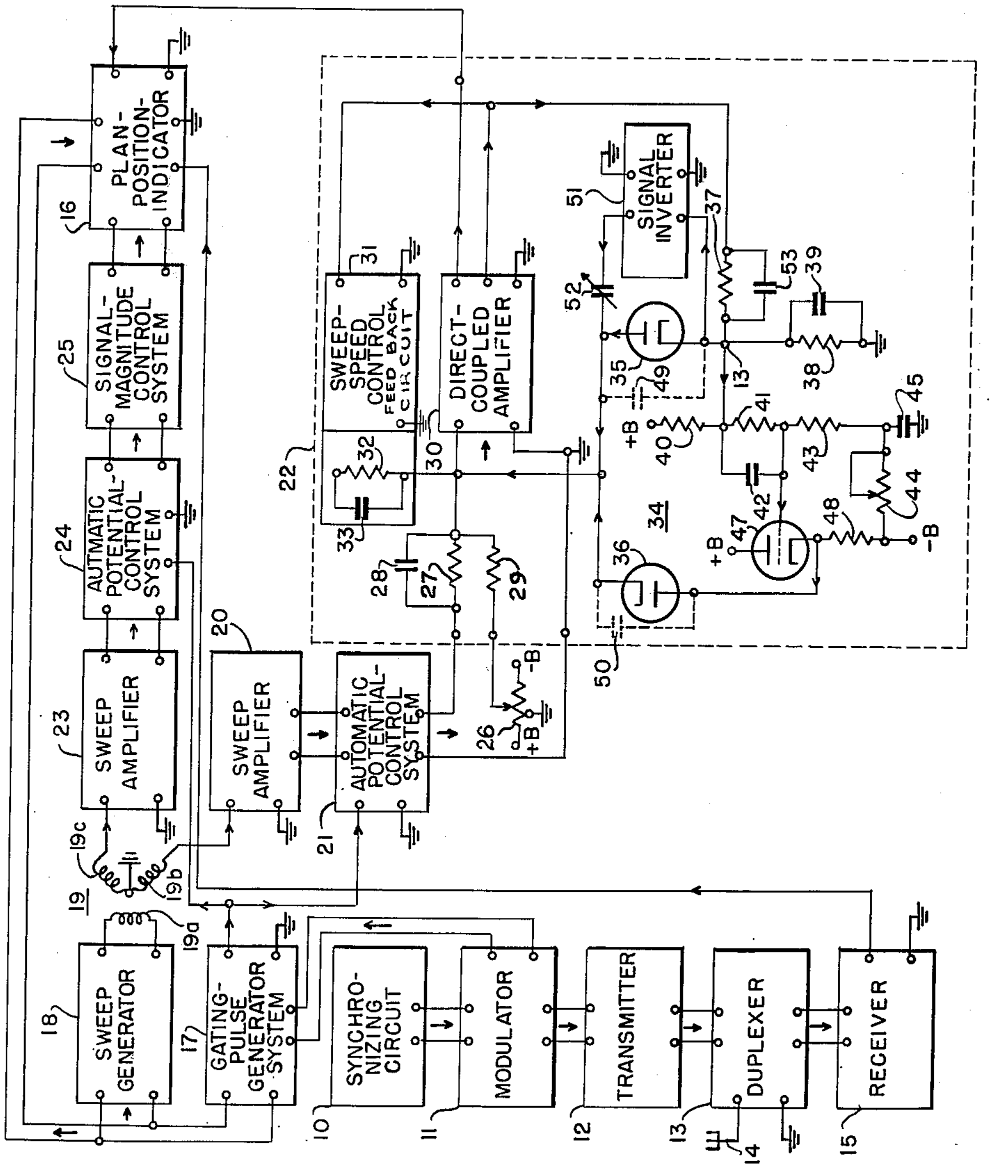

The present invention relates to signal magnitude control systems and, more particularly, to such systems of the type which limits to a predetermined level the magnitude of a signal derived thereby. Such a system has particular utility in a radar system and, hence, will be discussed in that environment.

Some signal magnitude control systems heretofore proposed for limiting the magnitude of a signal derived by the system to a predetermined level have had the disadvantage of not being readily usable in feed-back amplifier circuits such as those which respond to the sum of a plurality of input signals and which are subject, in the absence of suitable signal magnitude limiting, to overloading causing the circuits to require an undesirably long recovery time. In such feed-back amplifier circuits the signal developed in the input circuit of the amplifier usually has such a small magnitude that this signal cannot readily and percisely be limited to a predetermined level. Similarly, conventional signal magnitude limiting circuits utilized at intermediate points of the amplifier may cause improper circuit operation because there results limiting of the magnitude of the degenerative signal applied by the feed-back circuit to the input circuit.

It is an object of the present invention, therefore, to provide a new and improved signal magnitude control system which avoids one or more of the above-mentioned disadvantages and limitations of systems heretofore proposed.

It is another object of the invention to provide a new and improved signal magnitude control system for use as a feed-back amplifier for controlling the magnitude of the amplifier output signal over a range of magnitudes.

It is still another object of the invention to provide a new and improved signal magnitude control system for use as a feed-back amplifier for limiting the magnitude of the amplifier output signal to a pair of predetermined levels.

In accordance with a particular form of the invention, a signal magnitude control system comprises a circuit for supplying an input signal and a signal repeater having an output circuit and coupled to the supply circuit for deriving from the input signal an output signal of variable magnitude. The control system includes a degenerative first feed-back circuit coupled between the aforesaid output circuit and the supply circuit for applying to the supply circuit a first fraction of the output signal effective to control the magnitude of the output signal over the entire magnitude range thereof. The control system also includes a degenerative second feed-back circuit coupled between the aforesaid output circuit and the supply circuit and having a non-linear feed-back impedance over the magnitude range for applying to the supply circuit a variable second fraction of the aforesaid output signal appreciably greater than the aforesaid first fraction thereof over at least a predetermined portion of the magnitude range but appreciably smaller than the first fraction over the remainder of the range and effective to exert a dominant control of the magnitude of the output signal over the aforesaid predetermined portion of the aforesaid magnitude range.

For a better understanding of the present invention, together with other and further objects thereof, reference is had to the following description taken in connection with the accompanying drawings, and its scope will be pointed out in the appended claims.

Figure 2:
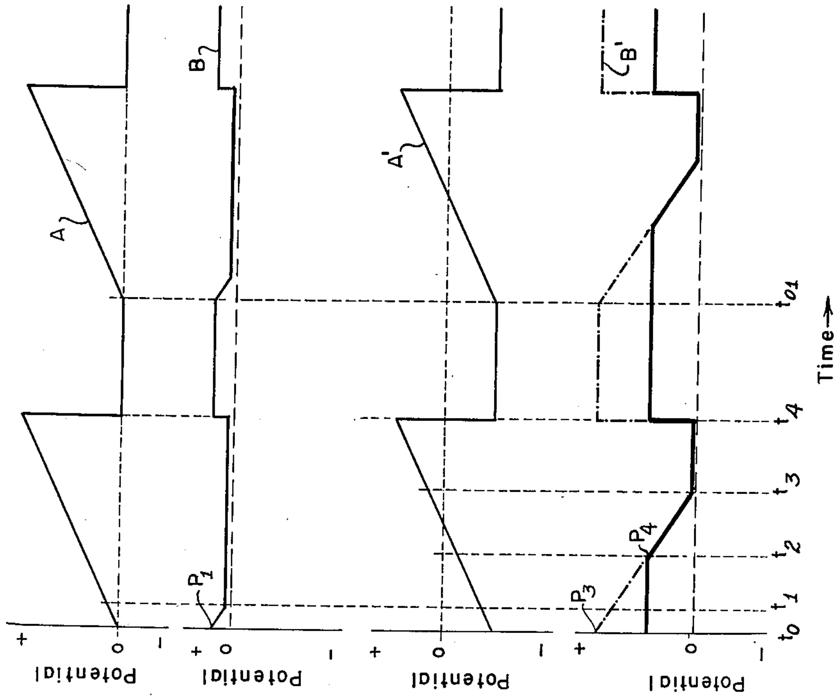

In the accompanying drawings, Fig. 1 is a schematic circuit diagram of a radar system including a signal magnitude control system constructed in accordance with a particular form of the invention; while Fig. 2 is a graph utilized in explaining the operation of the Fig. 1 signal magnitude control system.

*General description of Fig. 1 radar system*

Referring now more particularly to Fig. 1, there is represented a radar system including a signal magnitude control system constructed in accordance with the invention. The radar system comprises the usual synchronizing circuits 10 which may include a conventional repetition rate oscillator and pulse generator circuits well known in the art. The synchronizing circuits 10 are coupled through a modulator 11 of conventional construction to a transmitter 12 for transmitting pulse-modulated radar signals. The transmitter 12 is coupled in a usual manner to an antenna 14 through a duplexer 13 which may be of any suitable type, such as one described in Chapter XI of the text "Principles of Radar," second edition, by the Massachusetts Institute of Technology Radar School Staff, McGraw-Hill, 1946. The antenna 14 is also coupled through the duplexer 13 to a receiver 15 of conventional construction for receiving and detecting echo signals intercepted by the antenna 14 and for applying with amplification the video-frequency modulation components of these signals to an input circuit of a plan-position indicator 16 which may comprise a cathode-ray tube of a well-known type.

The radar system also includes a gating pulse generator system 17 coupled to an output circuit of the modulator 11 for generating gating pulses in response to trigger pulses applied thereto by the modulator. The gating pulse generator system 17 may be similar to that disclosed and claimed in applicant's copending application, Serial No. 246,456, filed September 13, 1951, entitled "Control System for Automatically Varying the Duration of Repetitive Pulses." An output circuit of the gating pulse generator system 17 is coupled to a sweep generator 18 for generating saw-tooth pulses during the intervals of the gating pulses applied thereto. This output circuit of the unit 17 is also coupled to the cathode-ray tube of the indicator 16 for rendering that tube conductive during the sweep time of the output signal of the sweep generator 18. Another output circuit of the unit 17 is coupled to an automatic potential-control system 21 and a similar system 24 for maintaining the potential at given points in these systems at predetermined values during the intervals intervening the intervals of the gating pulses applied to the units 21 and 24 by the gating pulse generator system 17. The units 21 and 24 may be similar to the system disclosed and claimed in the copending application Serial No. 246,413 of Henry Arkus, entitled "Automatic Potential-Control System," filed September 13, 1951.

The output circuit of the sweep generator 18 is coupled to the rotor winding 19*a* of a conventional signal resolver, such as a synchro 19 having two stator windings 19*b* and 19*c* displaced 90° from each other for resolving the output signal of the sweep generator 18 into two components having amplitudes which individually vary in accordance with the sine and cosine of the angle of the rotor winding 19*a* relative to a predetermined reference. The rotor winding 19*a* ordinarily is positioned in accordance with the position of the antenna 14 by any suitable means (not shown). The winding 19*b* is coupled to the input circuit of a suitable sweep amplifier 20 of one or more stages which is, in turn, coupled through the automatic potential-control system 21 to a signal magnitude control system 22, constructed in accordance with the invention and more fully described hereinafter. An adjustable voltage divider 26 connected between a source of negative potential —B and a source of positive potential +B is also coupled to the unit 22 for applying thereto a positive or negative unidirectional potential to displace the sweep origin on the cathode-ray tube screen of the plan-position indicator 16 and, in some cases, to control the time interval between the transmission of a radar pulse by the transmitter 12 and the initiation of the corresponding sweep on the cathode-ray tube screen. The output circuit of the unit 22 is coupled to a deflection circuit of the indicator 16 for supplying one component of a sweep signal to that indicator.

The stator winding 19*c* of the synchro 19 is coupled in a similar manner through a sweep amplifier 23, the automatic potential-control system 24, and a signal magnitude control system 25, similar to the unit 22 and constructed in accordance with the invention, to another deflection circuit of the plan-position indicator 16 for supplying another component of the sweep signal to that indicator.

Units 10–13, inclusive, 15, 16, 18–20, inclusive, 23 and the antenna 14 may all be of conventional construction and operation so that a detailed explanation of the operation thereof is deemed unnecessary.

*General operation of Fig. 1 radar system*

Considering briefly, however, the operation of the Fig. 1 radar system as a whole, the synchronizing circuits 10 periodically apply to the modulator 11 trigger pulses having a repetition frequency determined by the frequency of the repetition rate oscillator of the unit 10. For convenience, the arrows represent the direction of signal propagation. The trigger pulses from the unit 10 periodically fire the modulator 11 which, in turn, pulse-modulates the output signal of the transmitter 12 and causes the transmitter to apply to the antenna 14 through the duplexer 13 periodic bursts of high-frequency wave-signal energy. During the operation of the transmitter 12, the duplexer 13 protects the receiver 15 from being overloaded by the transmitted pulses. During the intervals between transmitted pulses, the receiver 15 responds to any echo signals intercepted by the antenna 14, detects the modulated components of these signals, and applies the detected signals to the plan-position indicator 16.

Output pulses of the modulator 11 are also applied to the gating pulse generator system 17. In response to these pulses, the gating pulse generator system 17 applies repetitive gating pulses to the sweep generator 18. During the intervals of these gating pulses, the sweep generator 18 develops saw-tooth pulses which are applied as a sweep signal to the rotor winding 19*a* of the synchro 19. Gating pulses are also applied by the gating pulse generator system 17 to the unit 16 to render conductive the cathode-ray tube of that unit during the sweep time of the output signal of the sweep generator 18.

The synchro 19 resolves the signal applied to the rotor winding 19*a* into two components having amplitudes which individually vary in accordance with the sine and cosine of the angle of the rotor winding 19*a* relative to a predetermined reference. A component of the sweep signal developed across the stator winding 19*b* is amplified by the sweep amplifier 20 and is applied through the automatic potential-control system 21 and the signal magnitude control system 22 to one deflection circuit of the plan-position indicator 16. The other component of the sweep signal developed across the stator winding 19*c* is amplified in a similar manner and applied to the other deflection circuit of the plan-position indicator 16 through the sweep amplifier 23, the automatic potential-control system 24 and the signal magnitude control system 25. The components of the sweep signal applied to the deflection circuits of the plan-position indicator 16 deflect the cathode-ray beam of the indicator 16 in a usual manner to develop on the screen thereof a plan view of the area being scanned by the radar apparatus.

*Description of Fig. 1 signal magnitude control system*

Referring now more particularly to the unit 22 of the Fig. 1 radar system, that unit comprises a signal magnitude control system constructed in accordance with the invention. The signal magnitude control system comprises a circuit for supplying an input signal, specifically, a circuit for supplying the algebraic sum of a periodic input signal and a unidirectional input signal. The supply circuit includes a resistor 27 and a parallel-connected high-frequency by-pass condenser 28 coupled to the output circuit of the automatic potential-control system 21 for supplying the periodic signal to the input impedance of a unit 30, presently to be described, and a resistor 29 coupled to the voltage divider 26 for suppling the unidirectional signal to the input impedance of the unit 30.

The signal magnitude control system also includes a signal repeater, namely, a direct-coupled amplifier 30 of conventional construction coupled to the supply circuit for deriving from the input signal applied to the amplifier 30 an output signal of variable magnitude. The direct-coupled amplifier 30 is also coupled to a deflection circuit of the plan-position indicator 16 for applying thereto one component of a sweep signal to deflect the cathode-ray beam of that indicator in a usual manner.

The signal magnitude control system also includes a degenerative first feed-back circuit coupled between an output circuit of the direct-coupled amplifier 30 and the supply circuit 27—29 and effective to control the magnitude of the output signal of the direct-coupled amplifier 30 over the entire magnitude range thereof. The first feed-back circuit comprises a sweep speed control feed-back circuit 31 including a resistor 32 and a parallel-connected high-frequency by-pass condenser 33 coupled between an output circuit of the direct-coupled amplifier 30 and the supply circuit 27—29. The time constants of the resistor-condenser networks 27, 28 and 32, 33 preferably are substantially the same. The sweep speed control feed-back circuit 31 may be similar to a portion of the sweep-speed control system disclosed and claimed in applicant's copending application, Serial No. 246,457, filed September 13, 1951, entitled "Periodic Signal Sweep Speed Control System," for adjusting the sweep speed of the output signal of the direct-coupled amplifier 30. More particularly, the feed-back circuit 31 may correspond, for example, to a portion of the feed-back circuit connected between the cathode circuit of tube 24 and the input circuit of unit 23 of the embodiment of the sweep-speed control system represented in the aforesaid copending application Serial No. 246,457. Accordingly, the feed-back circuit 31 may include, for example, counterparts of the resistors 28, 30, 31, the source —B, voltage divider 26, 26*a*, and resistor-condenser network 43, 44 with the switch element 40 connected to terminal 40*s* of the represented embodiment of the sweep-speed control system of the last-mentioned copending application. Specifically, the resistor-condenser network 32, 33 may, for example, be a counterpart of the resistor-condenser network 43, 44 of the copending application. The feed-back circuit 31 has a given impedance including the impedance of the elements 32 and 33.

A degenerative second feed-back circuit 34 is also coupled between an output circuit of the direct-coupled amplifier 30 and the supply circuit 27—29 and is effective to exert a dominant control of the magnitude of the output signal of the amplifier 30 over a predetermined portion of the magnitude range thereof. The second feed-back circuit preferably is coupled in a parallel relation with the first feed-back circuit and includes a unidirectionally conductive device having a nonlinear impedance small with respect to the given impedance of the first feed-back circuit over a predetermined portion of the magnitude range of the output signal of the amplifier 30 but large with respect to the given impedance of the first feed-back circuit over the remainder of the magnitude range of the output signal. More particularly, the second feed-back circuit includes a pair of diodes 35, 36 coupled with opposite polarities between the output circuit of the amplifier 30 and the supply circuit 27—29 and effective to provide for the second feed-back circuit 34 a low impedance over two predetermined portions of the magnitude range of the amplifier output signal and a high impedance over the remainder of the magnitude range.

The anode of the diode 35 is directly connected to the junction of supply circuit 27—29 and the amplifier 30 and the cathode of the diode 35 is coupled to the output circuit of the amplifier 30 through a voltage divider comprising a resistor 37 having a parallel-connected high-frequency by-pass condenser 53 and coupled in a series relation with a resistor 38 having a parallel-connected high-frequency by-pass condenser 39. The divider may be constructed to divide down by, for example, a 3:1 ratio the signal applied thereto by the direct-coupled amplifier 30 to provide stability in the operation of the unit 22. The cathode of the diode 35 is also coupled to the control electrode of a cathode-follower tube 47 through a voltage divider comprising a resistor 40, a resistor 41 having a parallel-connected high-frequency by-pass condenser 42, a resistor 43, an adjustable resistor 44 having a parallel-connected by-pass condenser 45 coupled in a series relation between the sources of negative and positive potential —B and +B, respectively. The voltage divider is proportioned to provide a more negative operating potential at the control electrode of the tube 47 than at the cathode of the tube 35 and, together with the voltage divider 37, 38 and the source +B, the voltage divider 40, 41, 43, 44 determines the magnitudes of the output signal of the unit 30 which cause conduction by the diodes 35 and 36. The anode of the tube 47 is directly connected to +B while the cathode of that tube is coupled through a cathode resistor 48 to the source —B to provide a low-impedance output circuit for the tube 47. The cathode of the tube 47 is directly connected to the anode of the diode 36 which has its cathode connected to the input circuit of the direct-coupled amplifier 30.

Interelectrode capacitances of the tubes 35 and 36 are indicated in broken-line construction as condensers 49 and 50, respectively, connected between the electrodes of the tubes 35 and 36, respectively. To counteract the effect of these interelectrode capacitances, an adjustable neutralizing condenser 52 and a signal inverter 51, which may comprise a suitable signal repeater of less than unity gain, are coupled between the anode and cathode of the tube 35.

*Operation of Fig. 1 signal magnitude control system*

The operation of the Fig. 1 signal magnitude control system may more easily be understood by referring to Fig. 2 of the drawings, which is a graph representing the potential-time characteristics of various signals developed in the unit 22. Curve A of Fig. 2 represents the algebraic sum of the periodic input signal and the unidirectional input signal applied to the direct-coupled amplifier 30 by the supply circuit 27—29 under operating conditions such that the magnitude of the unidirectional signal is zero because of adjustment of the voltage divider 26. The signal represented by curve A is the signal which would be developed at the junction of the resistors 27 and 29 in the absence of any degenerative feed-back from the output circuit of the direct-coupled amplifier 30. Because of the degenerative feed-back, however, there is actually developed at this junction only a small signal (not shown) representing the difference between the degenerative feed-back signal and the input signal represented by curve A.

In response to the input signal represented by curve A and in the absence of the second feed-back circuit 34, the amplifier 30 would apply to the sweep-speed control feed-back circuit 31 a signal (not shown) which sweeps negatively during a time interval $t_0$–$t_1$ from a positive potential $P_1$ to a limit outside the normal operating range of the unit 22 and which may be at, for example, zero potential resulting from the inability of the amplifier 30 to develop a negative output signal. Under such operating conditions during time intervals when the output signal of the amplifier 30 is at zero potential, the magnitude of the feed-back signal applied by the sweep-speed control feed-back circuit 31 to the supply circuit 27—29 would not be sufficient to prevent the input signal represented by curve A from causing the direct-coupled amplifier 30 to overload and require an undesirably long recovery time for proper translation of the signal applied thereto. The second feed-back circuit 34, therefore, is utilized to cause faithful reproduction of the input signal over the normal operating range of the unit 22 and to control the effective gain of the amplifier 30 outside that range. To this end, the circuit 34 applies through the diode 35 to the supply circuit 27—29 a control signal which exerts a dominant control of the magnitude of the output signal of the direct-coupled amplifier 30 over a predetermined portion of the magnitude range thereof, for example, the portion represented by curve B at slightly above zero potential and occurring during an interval $t_1$—$t_4$.

The relative values of the bias applied to the diode 35 and the periodic signal applied thereto by the voltage divider 37, 38 are such that the diode 35 is nonconductive while the output signal applied to the sweep-speed control feed-back circuit 31 and represented by curve B sweeps from a positive potential $P_1$ to, for example, slightly above zero potential during the time interval $t_0$—$t_1$. During the time interval $t_0$—$t_1$, the sweep-speed control feed-back circuit 31 exerts a dominant control of the effective gain of the amplifier 30 and, hence, of the magnitude of the output signal of the unit 30. More particularly, during this time interval, the sweep-speed control feed-back circuit 31 controls the effective gain of the amplifier 30 by determining what fraction of the feed-back signal is applied to the supply circuit 27—29 by the feed-back circuit 31. Adjustment of the effective gain of the amplifier 30 controls the rate of change of magnitude of the output signal thereof or, in other words, the sweep speed of that output signal. At the time $t_1$ when the signal represented by curve B reaches a potential slightly above zero, the diode 35 is rendered conductive and, because of the small conductive impedance thereof relative to the impedance of the resistor-condenser network 32, 33, the diode then exerts a dominant control of the effective gain of the direct-coupled amplifier 30 and, hence, of the magnitude of the output signal of that amplifier.

During the interval $t_1$—$t_4$, the diode 35 applies to the input circuit of the direct-coupled amplifier 30 a degenerative control signal of sufficient magnitude to reduce the effective gain of the amplifier and to limit the magnitude of the output signal thereof to a predetermined level, for example, to a potential slightly above zero. In this manner the second feed-back circuit 34 prevents overloading of the amplifier 30 which would otherwise occur. At the time $t_4$ when the signal represented by curve B rises to a positive potential, the diode 35 is rendered nonconductive. The sweep-speed control feed-back circuit 31 then dominantly controls the magnitude of the output signal of the direct-coupled amplifier 30 during the remaining interval $t_4$—$t_{01}$. Accordingly, under these operating conditions, a signal of wave form similar to curve B is applied by the direct-coupled amplifier 30 to the plan-position indicator 16 to sweep the cathode-ray beam of that indicator across the display screen thereof during the time interval $t_0$—$t_1$.

Under operating conditions when the voltage divider 26 is adjusted to apply a negative potential through the resistor 29 to the direct-coupled amplifier 30 to change the time interval during which the cathode-ray beam of the indicator 16 sweeps across the display screen thereof, the algebraic sum of this negative potential and the periodic signal applied to the direct-coupled amplifier 30 by the resistor-condenser network 27, 28 is represented by curve A'. It will be seen from curve A' that the negative potential may be considered as being effective to cause the signal of curve A' periodically to sweep from a negative to a positive potential. Accordingly, in the absence of the degenerative feed-back circuit 34, the amplifier 30 would provide an output signal as represented by curve B' shown partly in broken-line construction.

However, during the time $t_0$—$t_2$, when the output signal of the amplifier 30 tends to sweep from a positive potential $P_3$ to a less positive potential $P_4$, and during the time $t_3$—$t_4$, the degenerative feed-back network 34 exerts through the diodes 35 and 36 a dominant control of the magnitude of the output signal over the portions of the magnitude range corresponding to the time intervals $t_0$—$t_2$ and $t_3$—$t_4$. During these time intervals, the diodes 35 and 36 provide for the second feed-back circuit a low impedance relative to the impedance of the resistor-condenser network 32, 33 of the first feed-back circuit to limit the magnitude of the output signal of the amplifier 30 to a pair of predetermined levels, for example, $P_4$ and slightly above zero potential. More particularly, during the time interval $t_0$—$t_2$, the voltage divider 37, 38 applies a portion of the output signal of the direct-coupled amplifier 30 to the voltage divider 40, 41, 43, 44. The latter, in turn, divides the signal applied thereto for application to the control electrode-cathode circuit of the tube 47. During the time interval $t_0$—$t_2$, this signal renders the tube 47 sufficiently conductive to develop across the resistor 48 a positive potential which exceeds the opposing negative bias otherwise supplied to the anode of the diode 36 by the cathode-follower circuit. As mentioned previously, the signal developed at the junction of the resistors 27 and 29 at the input circuit of the direct-coupled amplifier 30 is of small magnitude and thus the cathode of the diode 50 is approximately at zero potential. Accordingly, during the time interval $t_0—t_2$, the diode 36 conducts, supplying a degenerative signal of sufficient magnitude to reduce the gain of the direct-coupled amplifier 30 and to limit the magnitude of the output signal of that amplifier to the predetermined level $P_4$. The fraction of the output signal applied to the supply circuit 27—29, inclusive, during the time interval $t_0—t_2$ is, of course, appreciably greater than the fraction applied to the supply circuit by the sweep-speed control feed-back circuit 31 during that interval. During the time interval $t_0—t_2$, the diode 35 is nonconductive because the cathode of that diode is maintained positive with respect to the anode thereof.

During the time interval $t_2—t_3$, the diode 36 is nonconductive because the signal applied to the control electrode-cathode circuit of the tube 47 by the voltage divider 40, 41, 43, 44 does not have sufficient magnitude to cause the development across the resistor 48 of a positive potential which exceeds the opposing negative bias supplied to the anode of the diode 36 and the anode of the diode 36 is negative with respect to the cathode thereof. Accordingly, during that time interval the magnitude of the output signal of the amplifier 30 sweeps from a positive potential $P_4$ to, for example, slightly above zero potential. Also, the cathode of the diode 35 is positive with respect to the anode thereof and thus the diode 35 is nonconductive during the time interval $t_2—t_3$. Thus, during the time interval $t_2—t_3$, the fraction of the output signal, for example zero, applied by the second feed-back circuit 34 to the supply circuit 27—29, inclusive, is appreciably smaller than the fraction applied to the supply circuit by the sweep-speed control feed-back circuit 31 during that interval. During the time interval $t_3—t_4$, the diode 35 conducts in a manner similar to that just explained in connection with curves A and B to reduce the effective gain of the amplifier 30 and to limit the magnitude of the output signal thereof to slightly above zero potential. Accordingly, the output signal of the direct-coupled amplifier 30 may be represented by the solid-line portion of curve B′ and during the time interval $t_2—t_3$ the signal applied to the deflection circuit of the indicator 16 is effective to sweep the cathode-ray beam of the indicator across the display screen thereof.

Because the high-frequency components of the output signal of the direct-coupled amplifier 30 may be coupled through the interelectrode capacitances 49 and 50 of the tubes 35 and 36, respectively, causing distortion of the frequency-response characteristic of the amplifier 30, the signal inverter 51 and neutralizing condenser 52 are utilized to cancel the effect of these interelectrode capacitances by applying to the input circuit of the direct-coupled amplifier 30 a signal of opposite phase to that applied thereto by the capacitances 49 and 50.

While applicant does not wish to be limited to any particular circuit constants, the following have been employed in a signal magnitude control system constructed in accordance with the invention, for example in the circuit of Fig. 1:

| | |
|---|---|
| Resistor 27 | 1 megohm |
| Resistor 29 | 1 megohm |
| Resistor 32 | 118 kilohms |
| Resistor 37 | 4 kilohms |
| Resistor 38 | 2 kilohms |
| Resistor 40 | 620 kilohms |
| Resistor 41 | 47 kilohms |
| Resistor 43 | 450 kilohms |
| Resistor 44 | 250 kilohms (max.) |
| Resistor 48 | 47 kilohms |
| Condenser 28 | 4 micromicrofarads |
| Condenser 33 | 34 micromicrofarads |
| Condenser 39 | 5 micromicrofarads |
| Condenser 42 | 100 micromicrofarads |
| Condenser 45 | .1 microfarad |
| Condenser 49 | 2 micromicrofarads (approx.) |
| Condenser 50 | 2 micromicrofarads (approx.) |
| Condenser 52 | 1.5–7 micromicrofarads |
| Condenser 53 | 10 micromicrofarads |
| Tube 35 | ½ section of type 6AL5 |
| Tube 36 | ½ section of type 6AL5 |
| Tube 47 | ½ section of type 12AT7 |
| Source −B | −180 volts |
| Source +B | +220 volts |

From the foregoing description it will be apparent that a signal magnitude control system constructed in accordance with the invention has the advantage that the system limits the magnitude of the output signal of a feed-back amplifier to two predetermined levels.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A signal magnitude control system comprising: a circuit for supplying the algebraic sum of a periodic input signal and a unidirectional input signal; a signal repeater having an output circuit and coupled to said supply circuit for deriving from said algebraic sum of said input signals an output signal of variable magnitude; a degenerative first feed-back circuit coupled between said output and supply circuits for applying to said supply circuit a first fraction of said output signal effective to control the magnitude of said output signal over the entire magnitude range thereof; a degenerative second feed-back circuit, including a pair of diodes coupled between said output and supply circuits with opposite polarities and in a parallel relation with said first feed-back circuit; and bias-circuit means coupled to said diodes for maintaining the same nonconductive over an intermediate portion of said magnitude range to impart to said second feed-back circuit a high impedance over said intermediate portion of said range; said diodes being responsive to said output signal for conducting over two extreme portions of said range to impart to said second feed-back circuit a low impedance over said extreme portions of said magnitude range; said second feed-back circuit being effective to apply to said supply circuit a variable second fraction of said output signal appreciably greater than said first fraction thereof over said extreme portions of said range but appreciably smaller than said first fraction over said intermediate portion of said range and which exerts a dominant control of the magnitude of said output signal over said extreme portions of said magnitude range to limit the magnitude of said output signal to two predetermined levels.

2. A signal magnitude control system comprising: a circuit for supplying an input signal; a signal repeater having an output circuit and coupled to said supply circuit for deriving from said input signal an output signal of variable magnitude; a degenerative first feed-back circuit coupled between said output circuit and said supply circuit for applying to said supply circuit a first fraction of said output signal effective to control the magnitude of said output signal over the entire magnitude range thereof; and a degenerative second feed-back circuit coupled between said output circuit and said supply circuit and having a nonlinear feed-back impedance over said magnitude range for applying to said supply circuit a variable second fraction of said output signal appreciably greater than said first fraction thereof over at least a predetermined portion of said magnitude range but appreciably smaller than said first fraction over the remainder of said range and effective to exert a dominant control of the magnitude of said output signal over said predetermined portion of said magnitude range.

3. A signal magnitude control system comprising: a circuit for supplying the algebraic sum of a periodic input signal and a unidirectional input signal; a signal repeater having an output circuit and coupled to said supply circuit for deriving from said algebraic sum of said input signals an output signal of variable magnitude; a degenerative first feed-back circuit coupled between said output circuit and said supply circuit for applying to said supply circuit a first fraction of said output signal effective to control the magnitude of said output signal over the entire magnitude range thereof; and a degenerative second feed-back circuit coupled between said output circuit and said supply circuit and having a nonlinear feed-back impedance over said magnitude range for applying to said supply circuit a variable second fraction of said output signal appreciably greater than said first fraction thereof over at least a predetermined portion of said magnitude range but appreciably smaller than said first fraction over the remainder of said range and effective to exert a dominant control of the magnitude of said output signal over said predetermined portion of said magnitude range.

4. A signal magnitude control system comprising: a circuit for supplying an input signal; a signal repeater having an output circuit and coupled to said supply circuit for deriving from said input signal an output signal of variable magnitude; a degenerative first feed-back circuit connected between said output and supply circuits for applying to said supply circuit a first fraction of said output signal effective to control the magnitude of said output signal over the entire magnitude range thereof; and a degenerative second feed-back circuit connected between said output and supply circuits in parallel with said first feed-back circuit and having a nonlinear feed-back impedance over said magnitude range for applying to said supply circuit a variable second fraction of said output signal appreciably greater than said first fraction thereof over at least a predetermined portion of said magnitude range but appreciably smaller than said first fraction over the remainder of said range and effective to exert a dominant control of the magnitude of said output signal over said predetermined portion of said magnitude range.

5. A signal magnitude control system comprising: a circuit for supplying an input signal; a signal repeater having an output circuit and coupled to said supply circuit for deriving from said input signal an output signal of variable magnitude; a degenerative first feed-back circuit having a given impedance and coupled between said output circuit and said supply circuit and effective to control the magnitude of said output signal over the entire magnitude range thereof; and a degenerative second feed-back circuit having a nonlinear impedance small with respect to said given impedance over a predetermined portion of said magnitude range but large with respect to said given impedance over the remainder of said range and coupled between said output circuit and said supply circuit and effective to apply to said supply circuit a variable fraction of said output signal which exerts a dominant control of the magnitude of said output signal over said predetermined portion of said magnitude range.

6. A signal magnitude control system comprising: a circuit for supplying an input signal; a signal repeater having one or more output circuits and coupled to said supply circuit for deriving from said input signal an output signal of variable magnitude; a degenerative first feed-back circuit coupled between one of said output circuits and said supply circuit and effective to control the magnitude of said output signal over the entire magnitude range thereof; a degenerative second feed-back circuit including a unidirectionally conductive device and coupled between one of said output circuits and said supply circuit; and bias-circuit means coupled to said device for maintaining said device nonconductive over all but a predetermined portion of said magnitude range to impart to said second feed-back circuit a nonlinear feed-back impedance over said magnitude range; said second feed-back circuit being effective to apply to said supply circuit a variable fraction of said output signal which exerts a dominant control of the magnitude of said output signal over said predetermined portion of said magnitude range to limit the magnitude of said output signal to a predetermined level.

7. A signal magnitude control system comprising: a circuit for supplying an input signal; a signal repeater having one or more output circuits and coupled to said supply circuit for deriving from said input signal an output signal of variable magnitude; a degenerative first feed-back circuit coupled between one of said output circuits and said supply circuit and effective to control the magnitude of said output signal over the entire magnitude range thereof; a degenerative second feed-back circuit including a pair of diodes coupled with opposite polarities between one of said output circuits and said supply circuit and responsive to said output signal; and bias-circuit means coupled to said diodes for maintaining said diodes individually nonconductive over all but two individual predetermined portions of said magnitude range to impart to said second feed-back circuit a low impedance over said two predetermined portions of said magnitude range and a high impedance over the remainder of said range; said second feed-back circuit being effective to apply to said supply circuit a variable fraction of said output signal which exerts a dominant control of the magnitude of said output signal over said predetermined portions of said magnitude range to limit the magnitude of said output signal to two predetermined levels.

8. A signal magnitude control system comprising: a circuit for supplying an input signal; a signal repeater having one or more output circuits and coupled to said supply circuit for deriving from said input signal an output signal of variable magnitude; a degenerative first feed-back circuit coupled between one of said output circuits and said supply circuit and effective to control the magnitude of said output signal over the entire magnitude range thereof; a degenerative second feed-back circuit including a pair of diodes coupled with opposite polarities between one of said output circuits and said supply circuit; and bias-circuit means coupled to said diodes for maintaining the same nonconductive over an intermediate portion of said magnitude range to impart to said second feed-back circuit a high impedance over said intermediate portion of said range; said diodes being responsive to said output signal for conducting over two extreme portions of said range to impart to said second feed-back circuit a low impedance over said extreme portions of said magnitude range; said second feed-back circuit being effective to apply to said supply circuit a variable fraction of said output signal which exerts a dominant control of the magnitude of said output signal over said extreme portions of said magnitude range to limit the magnitude of said output signal to two predetermined levels.

9. A signal magnitude control system comprising: a circuit for supplying an input signal; a signal repeater having one or more output circuits and coupled to said supply circuit for deriving from said input signal an output signal of variable magnitude; a degenerative first feed-back circuit coupled between one of said output circuits and said supply circuit and effective to control the magnitude of said output signal over the entire magnitude range thereof; and a degenerative second feed-back circuit coupled between one of said output circuits and said supply circuit and having a nonlinear feed-back impedance over said magnitude range for applying to said supply circuit a variable fraction of said output signal which exerts a dominant control of the magnitude of said output signal over a predetermined portion of said magnitude range.

JASPER J. OKRENT.

References Cited in the file of this patent

UNITED STATES PATENTS

| Number | Name | Date |
|---|---|---|
| 2,496,723 | Hipple, Jr. | Feb. 7, 1950 |
| 2,506,770 | Braden | May 9, 1950 |